United States Patent

Inabata

[11] Patent Number: 5,134,526
[45] Date of Patent: Jul. 28, 1992

[54] FOCUS DETECTING OPTICAL SYSTEM INCLUDING ECCENTRICALLY DISPOSED APERTURE STOPS

[75] Inventor: Tatsuo Inabata, Chofu, Japan

[73] Assignee: Olympus Optical Co., Ltd., Tokyo, Japan

[21] Appl. No.: 635,867

[22] Filed: Dec. 28, 1990

[30] Foreign Application Priority Data

Dec. 28, 1989 [JP] Japan .................................. 1-343526
Dec. 28, 1989 [JP] Japan .................................. 1-343527
Jan. 8, 1990 [JP] Japan .................................. 2-001262

[51] Int. Cl.$^5$ ........................ G02B 17/00; G01C 3/00
[52] U.S. Cl. ................................... 359/726; 359/739; 359/652; 359/718; 359/720; 250/201.8; 354/408
[58] Field of Search ............ 350/445, 449, 413, 432, 350/436, 450, 447, 286; 250/201.8; 354/408, 407, 406

[56] References Cited

U.S. PATENT DOCUMENTS

4,247,763  1/1981  Stauffer .
4,808,806  2/1989  Shindo et al. .................. 354/408

FOREIGN PATENT DOCUMENTS

55-149007  11/1980  Japan .
57-43409  3/1982  Japan .

Primary Examiner—Jon W. Henry
Attorney, Agent, or Firm—Cushman, Darby & Cushman

[57] ABSTRACT

A focus detecting optical system comprises two imaging optical systems which are composed of an integrally molded prism, and is adapted to perform focus detection on the basis of relative positional relationship between an image of an object formed with one of the imaging optical systems and another image of the object formed with the other imaging optical system. Ineffective optical path regions of the surfaces of the prism which allow transmission or reflection of the rays entering the prism are designed as light diffusing surfaces and/or surfaces coated with a light absorption substance. An aperture stop arranged before each surface of incidence of light is arranged eccentrically with regard to the optical axis of incident rays or each surface of incidence of light has a refractive power asymmetrical with regard to said optical axis so that all the rays incident on the totally reflecting surfaces arranged in the two imaging optical systems are totally reflected. The integrally molded prism can comprise a plurality of pairs of the imaging optical systems. This focus detecting optical system can be manufactured at a low cost, has a high distance measurement accuracy and requires substantially no mutual matching for optical elements used therein.

4 Claims, 13 Drawing Sheets

FOCUS DETECTING OPTICAL SYSTEM INCLUDING ECCENTRICALLY DISPOSED APERTURE STOPS

BACKGROUND OF THE INVENTION a) Field of the Invention

The present invention relates to a focus detecting optical system for use with photographic cameras, video cameras, still video cameras and so on.

b) Description of the Prior Art

Among the active type focus detecting optical systems which are so adapted as to perform focus detection by receiving reflected infrared light with a plurality of optical systems having parallax while projecting infrared light to objects to be photographed and the passive type focus detecting optical systems which are so adapted as to perform focus detection by receiving images of objects to be photographed with a plurality of optical systems having parallax, there are known numerous conventional focus detecting optical systems which are composed separately from photographic lens systems, as typically exemplified by the optical system disclosed by Japanese Patent Preliminary Publication No. Sho 55-149007 shown in FIG. 1 and that disclosed by Japanese Utility Model Preliminary Publication No. Sho 57-43409 shown in FIG. 2.

Each of these focus detecting optical systems is so designed as to detect a distance to an object to be photographed by detecting positional deviation between two images formed with two imaging optical systems which have the same composition and arranged with parallax. In FIG. 1, a first imaging optical system comprises a positive lens component 1 arranged in an optical path which is bent by a reflecting mirror 2 and a reflecting surfaces 3 so that the lens component 1 forms an image of the object to be photographed on a photoelectric converter element 7 such as a CCD (Charge Coupled Device) array or PSD (Semiconductor Position Sensing Device). A second image optical system consisting of a reflecting mirror 5, a reflecting surface 6 and a positive lens conpoment 4, i.e., having the same composition as that of the first imaging optical system, is arranged symmetrically with the first imaging optical system on the paper surface. In FIG. 2, the optical elements described above are formed integrally as a prism 8 which has a surface of incidence 1 functioning as the positive lens component as well as reflecting surfaces 2 and 3 designed as totally reflecting surfaces. The focus detecting optical system shown in FIG. 1 or FIG. 2 is of the so-called passive type wherein each of the first and second imaging optical systems forms an image while receiving light emitted from an object to be photographed. The so-called active type focus detecting optical system is adapted to form a light spot on the photoelectric converter element 7 while projecting light from a light emitting element such as a light emitting diode arranged at the location of P shown in the drawing on a photoelectric converter element 7 through the prism 8, in the example shown in FIG. 2, and condensing the light reflected by the object to be photographed on the photoelectric converter element 7 through the other optical system 9. The passive type focus detecting optical system calculates a distance to the object to be photographed by detecting a spacing between the two images, whereas the active type focus detecting optical system calculates the distance to the object by detecting a position of the light spot formed on the photoelectric converter element 7.

FIG. 3 and FIG. 4 illustrate, on an enlarged scale, one of the imaging optical systems of the focus detecting optical system shown in FIG. 2. In these drawings, the reference symbols a and b represent rays emitted from an object on which the photographic lens system is to be focused, with the symbol a corresponding to the upper marginal ray and the symbol b responding to the lower marginal ray. The reference symbol O designates the optical axis. Further, the reference symbol c denotes a stray light constituting a cause for ghost typically represented in the drawings by a ray on the meridional surface which is incident on an imaginary surface S placed on the surface of incidence of the positive lens component 4 at an angle of incidence of 89° and at a location 3 mm above the optical axis. The reference numeral 10 represents the light exit surface of the prism 9 and the reference numeral 7a designates the light receiving surface of the photoelectric converter element 7. In the example shown in FIG. 3, a bonding agent 11 is filled between the light exit surface 10 and the light receiving surface 7a for fixing the photoelectric converter element 7 and preventing foreign matters from entering therebetween, whereas no substance is filled and an air layer is formed between the light exit surface 10 and the light receiving surface 7a in the optical system shown in FIG. 4. In the case of FIG. 3, the stray light c travels from the positive lens component 4 into the prism 9, emerges from the light exit surface 10 and attains directly to the light receiving surface 7a without falling on the first reflecting surface 5 or the second reflecting surface 6. In the case of FIG. 4, the stray light c travels from the positive lens component 4 into the prism 9, is totally reflected by the light exit surface 10 and then reflected by the second reflecting surface 6, transmits through the light exit surface 10 and attains to the light receiving surface 7a. As is clear from the foregoing description, each of the optical systems shown in FIG. 3 and FIG. 4 has a defect that it allows the stray light c coming from an object other than that to be photographed to attain on the light receiving surface 7a, thereby constituting a cause for erroneous distance measurements.

Further, when a stop having an aperture diameter of 2 mm, for example, is arranged right before the surface of incidence of the positive lens component 4 or 1 in a position symmetrical with regard to the optical axis as shown in FIG. 5 and FIG. 6 which are enlarged partical sectional views like those illustrated in FIG. 3 and FIG. 4, the lower marginal ray having a height of incidence of −1 mm on the stop surface, out of the paraxial rays, is not totally reflected by the first reflecting surface 5, but transmits therethrough. Furthermore, rays having heights of incidence −0.5 mm and −1 mm on the stop surface contained in a light bundle to be incident on an offaxial location having an image height of 0.3 mm are not totally reflected by the first reflecting surface 5, but transmit therethrough since the stop having the aperture diameter of 2 mm is arranged symmetrically with regard to the optical axis. Accordingly, each of the optical systems illustrated in FIG. 5 and FIG. 6 poses a problem that it is incapable of leading all of the required rays to the light receiving surface 7a of the photoelectric converter element 7, thereby making it impossible to maintain the minimum light amount required for focusing so far as the first reflecting surface 5 is not coated with a reflecting substance such as aluminum.

Moreover, as is understood from the fact that the number of the reflected rays is different between FIG. 5 and FIG. 6, the amount of light is different between the paraxial ray and the offaxial ray due to the nonuniform total reflection, thereby making distribution of brightness nonuniform on the light receiving surface 7a. Accordingly, the optical system poses a problem that light amount is reduced and distance measurement is erroneous more frequently for focusing the photographic lens system on an object located at a more offaxial position or a shorter distance. Coating the first reflecting surface 5 with a reflective substance such as aluminum will undesirably enhance manufacturing cost of the optical system.

In addition, the above-described focus detecting optical systems have field angles far narrower than those of the photographic lens systems to be used therewith, thereby posing a problem that the optical system is incapable of measuring distance within a broad range covering the entire photographing image surface. For this reason, the conventional focus detecting optical systems posed another problem that, when an image of an object to be photographed is not located at the central portion of the image surface, it is required to locate the image within the field angles of the focus detecting optical systems and lock the focusing system before performing framing, thereby retarding timing of shutter release of missing optimum shutter release chance. When the field angles of the focus detecting optical systems are simply made wider than that currently available, the first and second imaging optical systems will aggravate distortion and other aberrations, thereby making it impossible to maintain the correct spacing between the images or form a correct spot image.

Out of the conventional focus detecting optical systems described above, the optical system illustrated in FIG. 1 comprises a large number of optical elements or parts, thereby posing a problem that it requires high manufacturing cost and adjustments for matching the optical elements with one another, which further enhance manufacturing cost of the focus detecting optical system.

SUMMARY OF THE INVENTION

A primary object of the present invention is to provide a focus detecting optical system which is adapted to allow no error in distance measurement even when stray light enters a prism comprised therein.

Another object of the present invention is to provide a focus detecting optical system which is capable of leading uniform rays in an amount required and sufficient for distance measurement to a light receiving surface thereof.

A further object of the present invention is to provide a focus detecting optical system which permits focusing without locking a focusing system even when an image of an object to be photographed is not located at the central portion of photographing image surface, can be manufactured at a low cost and requires nearly no adjustment.

According to the present invention, the primary object mentioned above can be attained by composing two imaging optical systems of a single prism member molded as an integral part, designing an ineffective optical path region of at least one of the surfaces of the prism which reflects or allows to transmit therethrough the rays having entered into the prism as at least one of a light diffusing surface and a light absorptive surface, and detecting focused condition based on relative positional relationship between an image of an object formed by one of said two imaging optical systems and another image of the object formed by the other optical system. The term "ineffective optical path region" means the region other than the effective optical path region of the prism surface which reflects or allows to pass therethrough the rays coming from an object to be photographed on which a photographic lens system is to be focused.

According to the present invention, the second object mentioned above can be attained by: forming as an integrally molded prism member, a first imaging optical system comprising a first aperture stop arranged on a first optical axis so as to be perpendicularly intersect therewith and a first totally reflecting surface arranged so as to be obliquely intersecting with the first optical axis, and a second imaging optical system comprising a second aperture stop arranged on a second optical axis so as to be perpendicularly intersecting therewith and a second totally reflecting surface arranged so as to obliquely intersect the second optical axis; positioning the centers of the first and second aperture stops eccentric relative to the first and second optical axes respectively so that all the rays incident on the first and second totally reflecting surfaces are reflected; and detecting a focused condition based on relative positional relationship between an image of an object formed by the first imaging optical system and another image formed by the second imaging optical system.

According to the present invention, the second object mentioned above can be attained also, instead of positioning said first and second aperture stops eccentric relative to the optical axes, by designing the first and second optical systems so as to have refractive powers of the surfaces of incidence thereof asymmetrical with regard to the first and second optical axes respectively, or positioning said surfaces of incidence eccentric relative to the first and second optical axes respectively so as to change angles of incidence of the entire light bundle on the first and second totally reflecting surfaces respectively. Alternately, it is possible to design each of the surface of incidence as a birefringent surface composed, for example, of a liquid crystal so that only the rays which transmit through the totally reflecting surface will be extraordinary rays and have angles of refraction different from those of the ordinary rays which are reflected by the totally reflecting surfaces.

According to the present invention, the third object mentioned above can be attained by composing a plurality of blocks comprising said first imaging optical system and said second imaging optical system respectively of a single prism member molded as an integral part, and detecting a focused condition based on relative positional relationship between an image of an object formed by each of the first imaging optical systems and another image of the object formed by each of the second imaging optical systems.

These and other objects as well as the features and advantages of the present invention will become apparent from the following detailed description of the preferred embodiments when taken in conjunction with the accompanying drawings.

DESCRIPTION OF THE PREFERRED EMBODIMENTS

Figure 1:
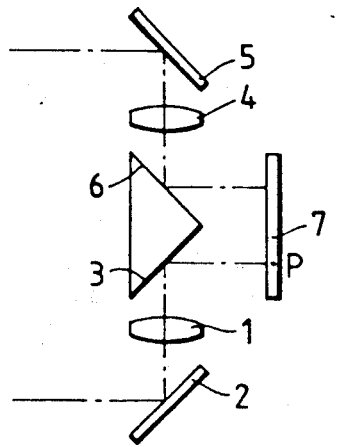
FIG. 1 and FIG. 2 are sectional views illustrating configurations of the conventional focus detecting optical systems respectively.
Figure 2:
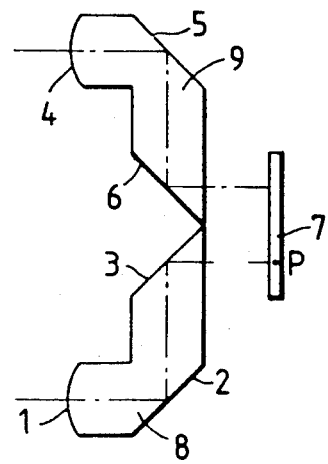
Figure 3:
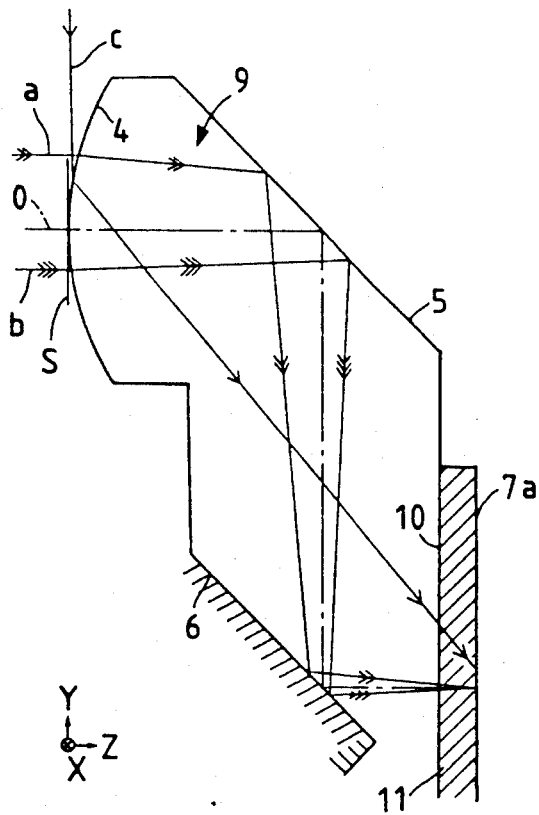
FIG. 3 and FIG. 4 are sectional views illustrating on an enlarged scale, the conventional example shown in FIG. 2 wherein a layer of a bonding agent and a layer of air are formed between the light exit surface of the first or second imaging optical system and the surface of the photoelectric converter element.
Figure 4:
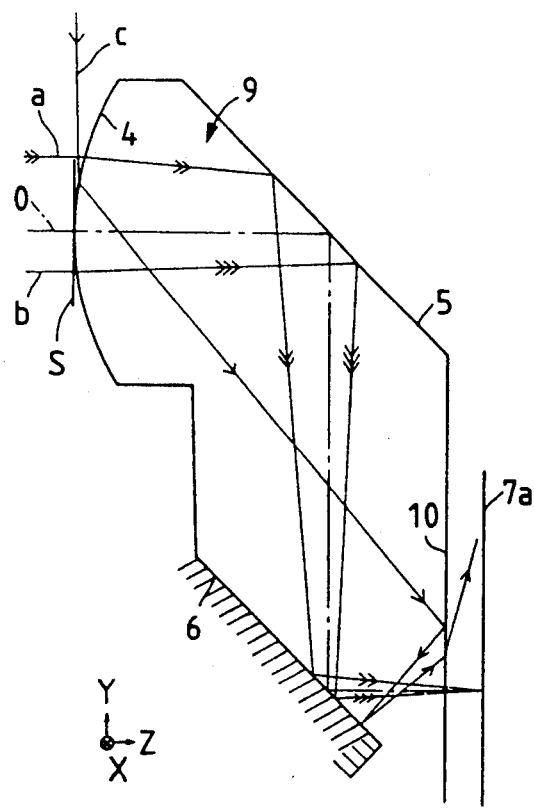
Figure 5:
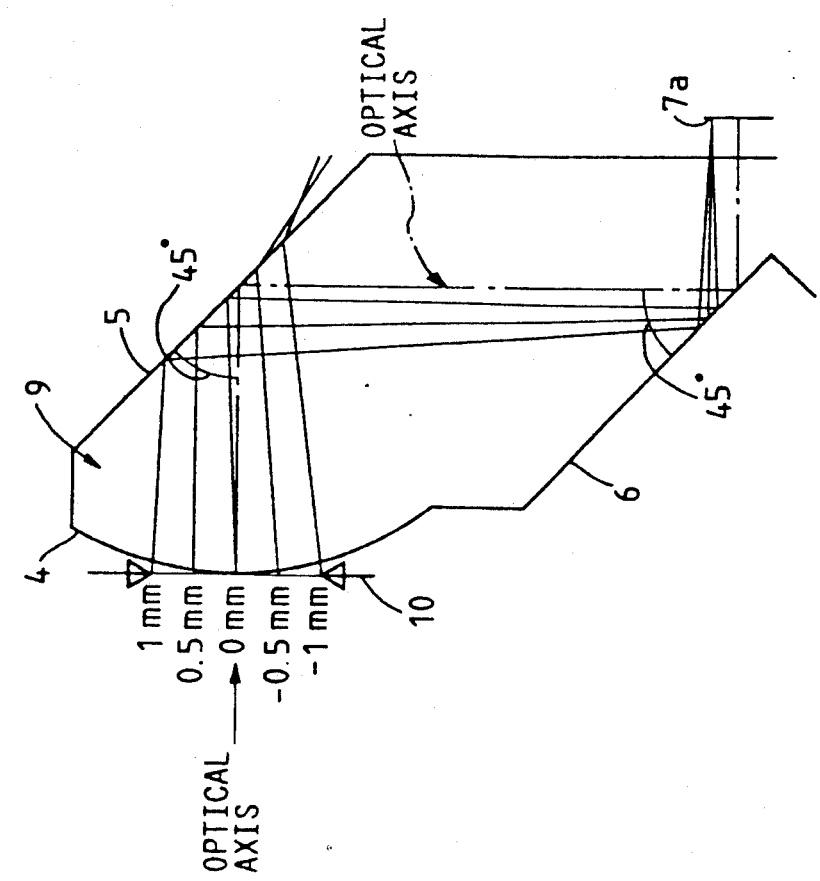
FIG. 5 and FIG. 6 are sectional views illustrating, on an enlarged scale, how the paraxial rays and the offaxial rays reflected in the first or second imaging optical system of the conventional example shown in FIG. 2.
Figure 6:
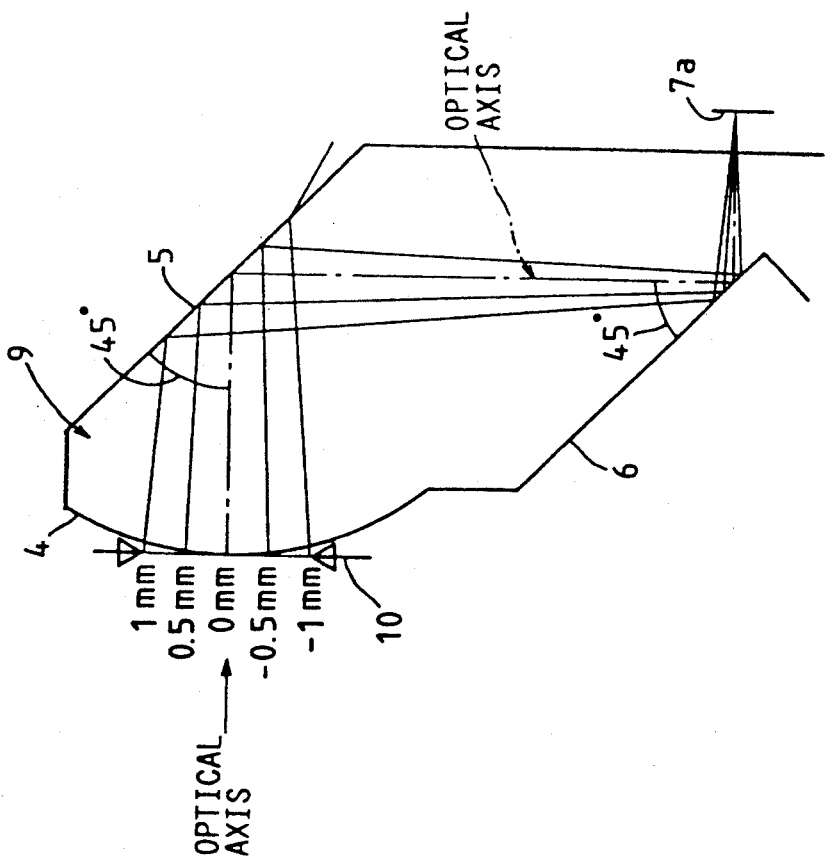

Now, the present invention will be described in more detail below with reference to the preferred embodiments illustrated in the accompanying drawings wherein members and parts which are substantially the same as one another are represented by the same reference numerals.

Figure 7:
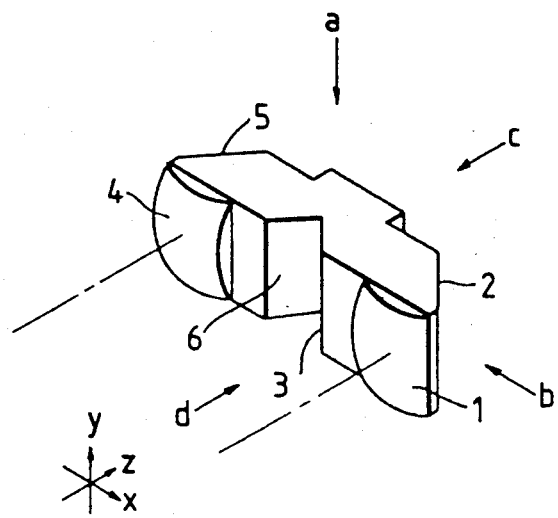
FIG. 7 is a perspective view illustrating Embodiment 1 of the focus detecting optical system according to the present invention.
Figure 9:
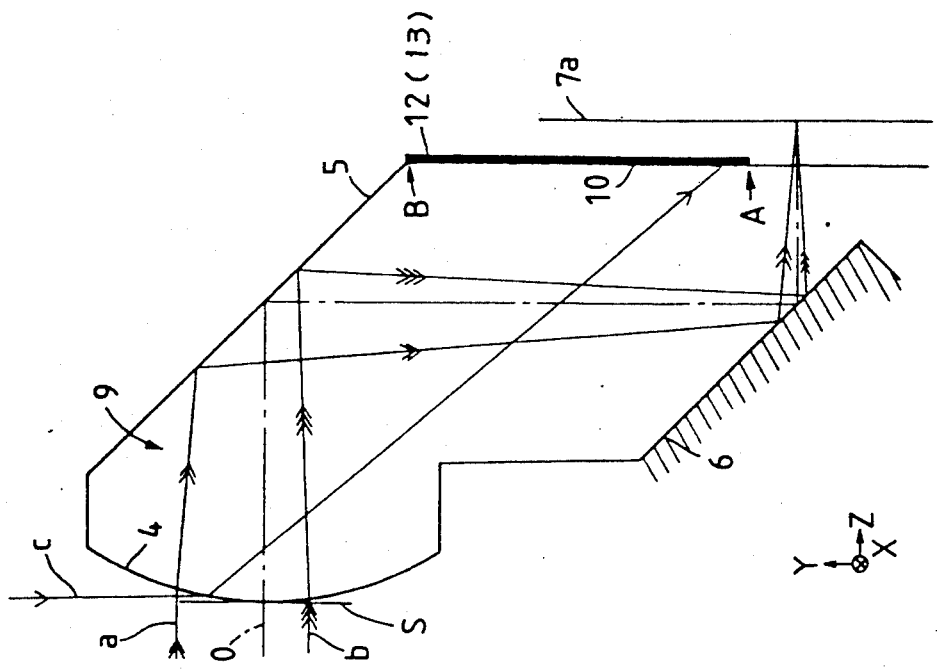
FIG. 9 and FIG. 10 are sectional views illustrating structures for preventing stray light in the cases where a layer of a bonding agent and a layer of air are formed respectively between the light exit surface and the light receiving surface of the photoelectric converter element in Embodiment 1 of the focus detecting optical system according to the present invention.
Figure 10:
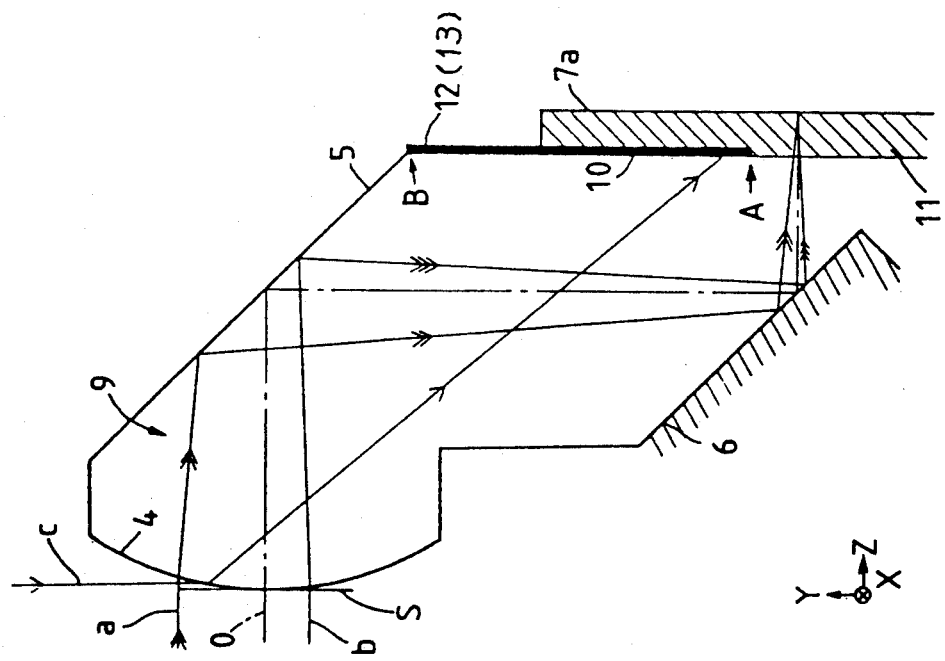

FIG. 7 is a perspective view illustrating the Embodiment 1 of the focus detecting optical system according to the present invention. As is seen from this drawing, this focus detecting optical system is composed of an integrally molded block which comprises a first imaging optical system consisting of a positive lens component 1 and totally reflecting surfaces 2 and 3, and a second imaging optical system consisting of a positive lens component 4 and totally reflecting surfaces 5 and 6, the first and second imaging optical systems having the same compositions as those of the conventional example. The surfaces other than the effective optical path regions for allowing transmission of light bundles for forming images of an object are prepared as light diffusing surfaces like ground glass surfaces for eliminating stray light or covered with light shielding layers. FIG. 8A through FIG. 8D illustrate the effective optical path regions and the other regions in details. The light diffusing surfaces or light shielding layers are formed at the regions other than the region of incidence of the surface of the lens component 1 and totally reflecting region of the reflecting surface 2 in FIG. 8B, at the regions other than the totally reflecting regions of the reflecting surfaces 2 and 5 as well as the region of the exit surface 10 allowing transmission of the rays for forming an image of an object to be photographed in FIG. 8C, and at the regions other than the regions of the surfaces of the lens components 1 and 4 on which rays are incident as well as the regions of the reflecting surfaces 3 and 6 allowing transmission of rays in FIG. 8D. FIG. 9 and FIG. 10 illustrate one of the imaging optical systems on a larger scale. FIG. 9 and FIG. 10 illustrate one of the imaging optical systems on a larger scale. FIG. 9 illustrates a stray light preventive structure in the imaging optical system wherein the bonding agent 11 is filled between the exit surface 10 and the light receiving surface 7a, whereas FIG. 10 shows another stray light preventive structure in the imaging optical system wherein an air layer is formed between the exit surface 10 and the light receiving surface 7a. In either of the imaging optical systems, the section A-B of the exit surface 10 through which the light bundle emitted from an object to be photographed does not pass is designed as a light diffusing surface 12 or a surface coated with a light absorptive substance 13, whereby the stray light c is shielded by this surface 12 or 13 and does not attain to the light receiving surface 7a. Accordingly, detrimental light is not incident on the photoelectric converter element 7 and accuracy of distance measurement is enhanced. In these drawings, the light shielding means such as the light diffusing surfaces formed at the regions other than the light exit surface of the prism are omitted. Films, etc. formed by coating a paint mixed with a light absorptive substance such as Chinese ink can be used as the light shielding layers and it is more effective for eliminating the stray light to coat the light diffusing surfaces with this type of paint so as to obtain the effect due to the light diffusion and that due to the light absorption at the same time.

Figure 8A:
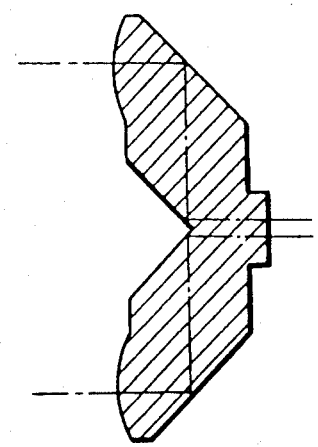
FIG. 8A, FIG. 8B, FIG. 8C and FIG. 8D are sectional views take in the directions indicated by the arrows a, b, c and d shown in FIG. 7.
Figure 8B:
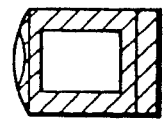
Figure 8C:
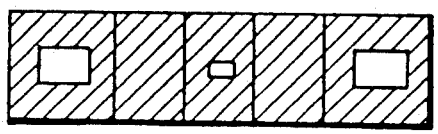
Figure 8D:
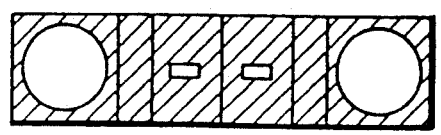
Figure 11:
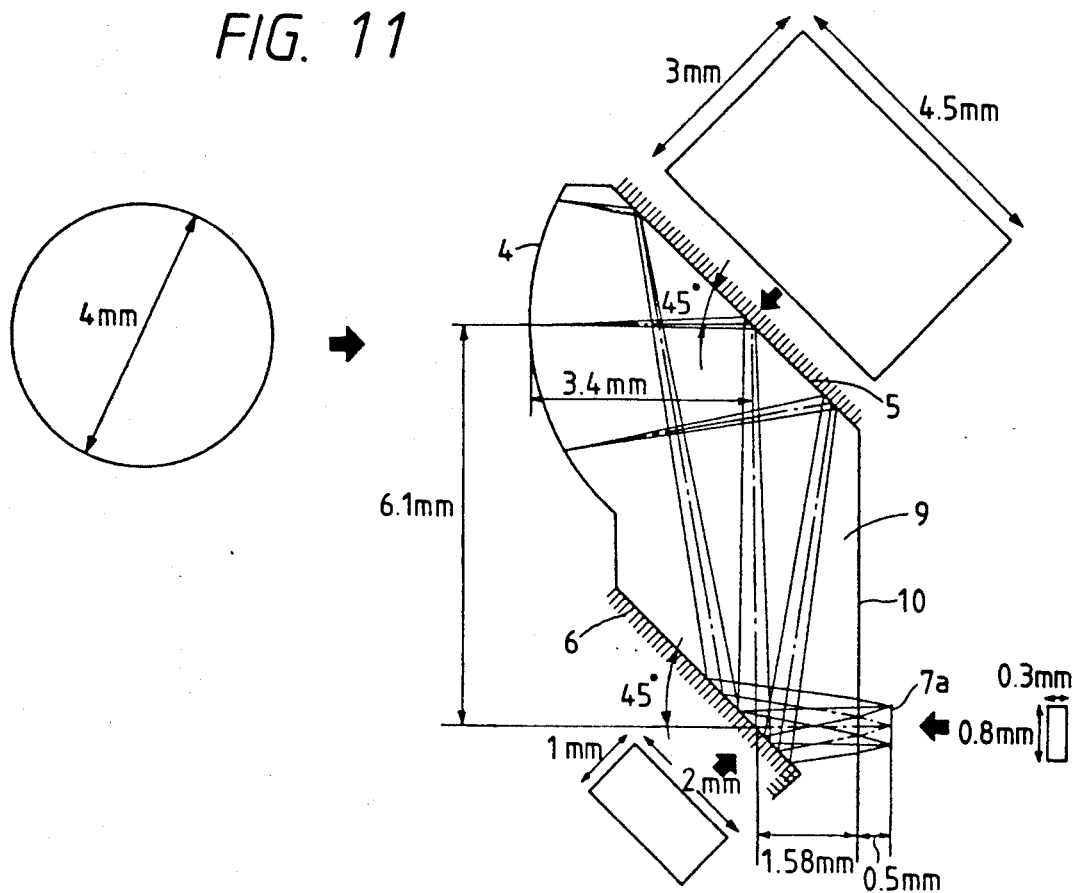
FIG. 11 is a sectional views illustrating sizes of the sections and angles of the reflecting surfaces of one of the two imaging optical systems as well as shapes and sizes of the effective optical path region seen in the direction indicated by each of the arrows in the Embodiment 1 of the present invention.

FIG. 11 is a sectional view illustrating concrete sizes of the imaging optical system used in the Embodiment 1 as well as numerical values of the sizes of the effective optical path regions, i.e., the blank areas shown in FIG. 8B through FIG. 8D. However, only 7a does not correspond to any one of the blank areas shown in FIG. 8B through FIG. 8D, but indicates the size of an image of an object to be photographed. Further, the positive lens component 4 has the numerical data listed below:

| Radius of curvature on the surface of incidence | $R = 3.87576$ |
|---|---|
| Aspherical surface coefficients | $P = 0.378637$ |
| | $E = -0.106781 \times 10^{-2}$ |
| | $F = 0.901748 \times 10^{-3}$ |
| | $G = -0.243196 \times 10^{-3}$ |
| | $H = 0.235946 \times 10^{-4}$ |

Formula of aspherical surface:

$$z = \frac{Cy^2}{1 + \sqrt{1 - PC^2y^2}} + Ey^4 + Fy^6 + Gy^8 + Hy^{10}$$

Wherein the optical axis is taken as the z axis.

| Refrective indices of the prism member | $n_d = 1.49216$ |
|---|---|
| | $n_c = 1.48957$ |
| | $n_e = 1.4942$ |
| | $n_F = 1.49813$ |

NA=0.24, f=7.9, Image height=0.2 wherein the wavelength of the d-line is taken as standard, the reference symbol NA represents the numerical aperture of the imaging optical system on the object side and the reference symbol f designates the focal length of the positive lens component.

Accordingly, the stray light is shielded by the light diffusing surfaces or the surfaces coated with the light absorptive agent of the ineffective optical path region and does not attain to the light receiving surface 7a of the photoelectric converter element 7, whereby the Embodiment 1 does not allow the distance measurement to be erroneous.

Figure 12:
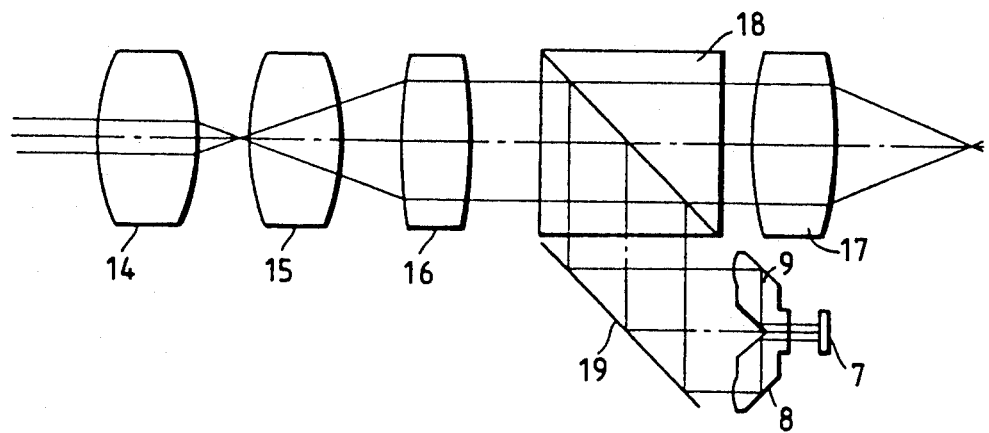
FIG. 12 is a sectional view illustrating an example of application of the Embodiment 1 of the present invention.

The focus detecting optical system according to the present invention is generally used as the non-TTL type which is separate from a photographic lens system, but may be used as the TTL type. That is to say, it is possible to split an optical path into a direction separate from that to the photographing optical path by arranging a beam splitter 18 in an afocal section of a photographic lens system composed of a focusing lens unit 14, a varifocal lens unit 15, a compensator lens unit 16 and a relay lens unit 17, and arranging the focus detecting optical system with a mirror 19 interposed as shown in FIG. 12.

Figure 13:
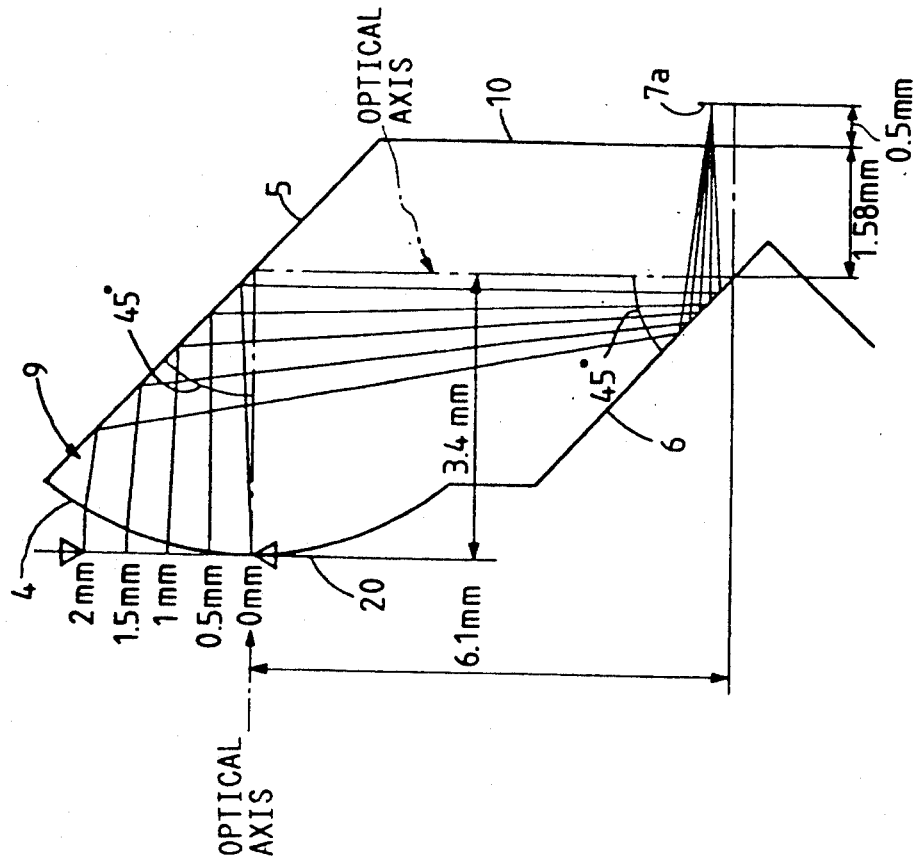
FIG. 13 is a sectional view illustrating sizes of the sections and angles of the reflecting surfaces of one of the two imaging optical systems of Embodiment 2 of the present invention.

FIG. 13 illustrates the Embodiment 2 of the present invention. In this embodiment, an aperture stop 20 is arranged on the surface of incidence of the positive lens component 4 in a position eccentric relative to the optical axis of the positive lens component 4 in the direction farther from the other imaging optical system, i.e., upward in FIG. 13.

The imaging optical system has the sizes specified in the drawing, and the aperture stop has an aperture diameter of 2 mm and eccentricity of 0.5 mm. Owing to this design, the upper and lower axial marginal rays are also totally reflected by the first reflecting surface and led onto the light receiving surface 7a of the photoelectric converter element 7. The first reflecting surface 5 is set at an angle of 45°. Accordingly, the Embodiment 2 allows all the axial rays incident on the first reflecting surface to be totally reflected, eliminates the necessity to coat the first reflecting surface 5 with a reflective substance such as aluminum and makes it possible to manufacture the imaging optical system with high precision at a low cost.

Figure 14:
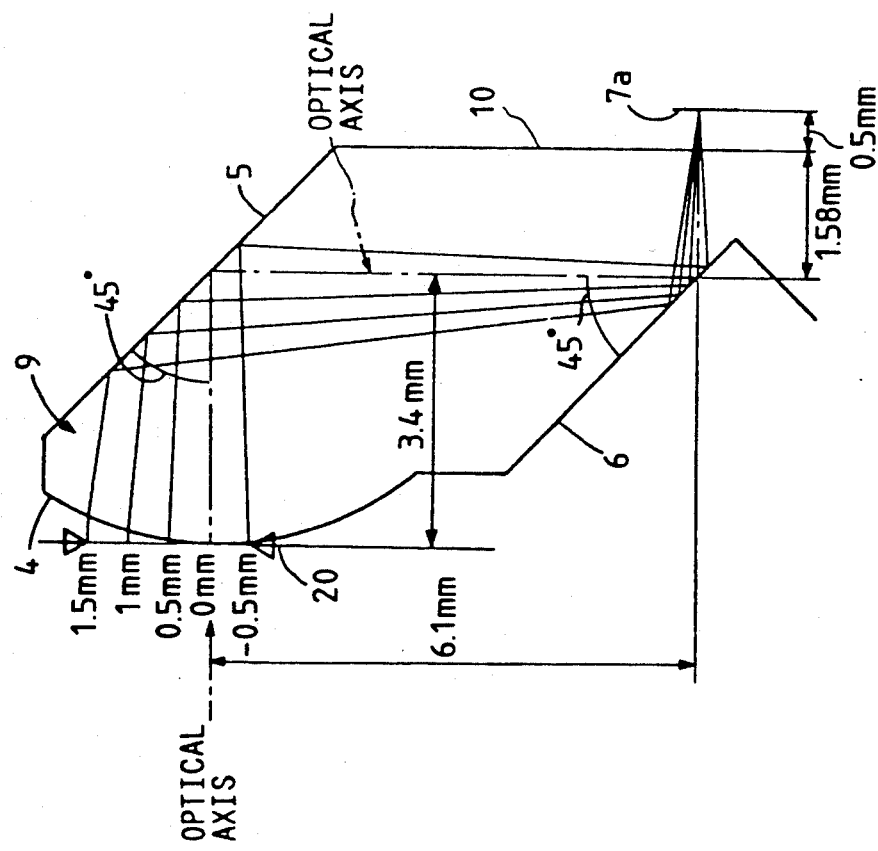
FIG. 14 and FIG. 15 are sectional views illustrating sizes of sections and angles of the reflecting surfaces of one of the two imaging optical systems of Embodiments 3 and 4 of the present invention.

FIG. 14 illustrates the Embodiment 3 of the present invention. In this embodiment, the aperture stop 20 is arranged more eccentrically than that used in the Embodiment 2, i.e., 1 mm above the optical axis of the positive lens component 4, so that the marginal portion of the aperture stop 20 is located on the optical axis of the positive lens component 4. Owing to this arrangement of the aperture stop 20, even the lower marginal ray to be incident on an offaxial object point having an image height of 0.3 mm is totally reflected by the first reflecting surface 5 and led favorably to the light receiving surface 7a of the photoelectric converter element 7. The first reflecting surface is set at an angle of 45° in the Embodiment 3.

Figure 15:
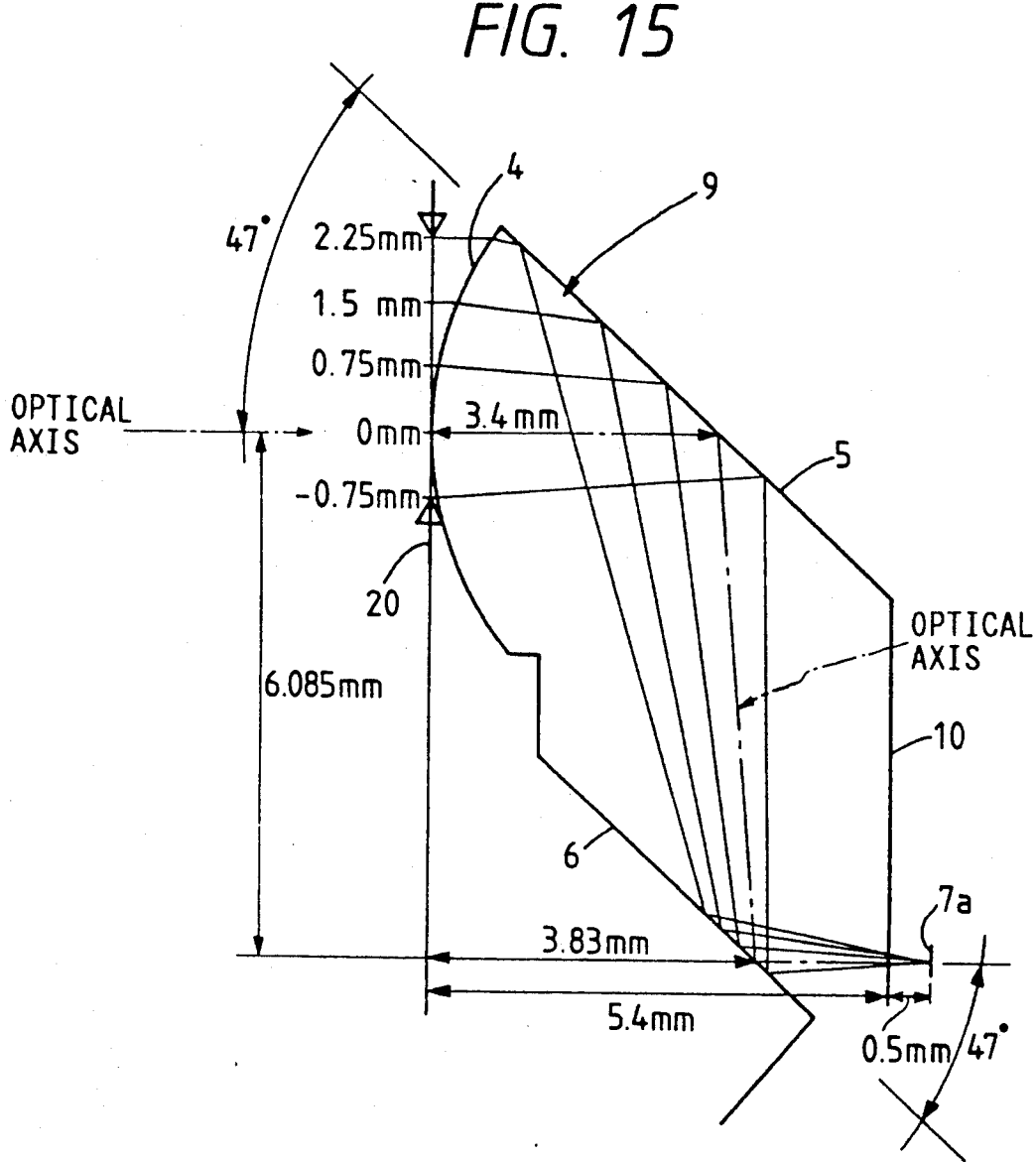
Figure 16:
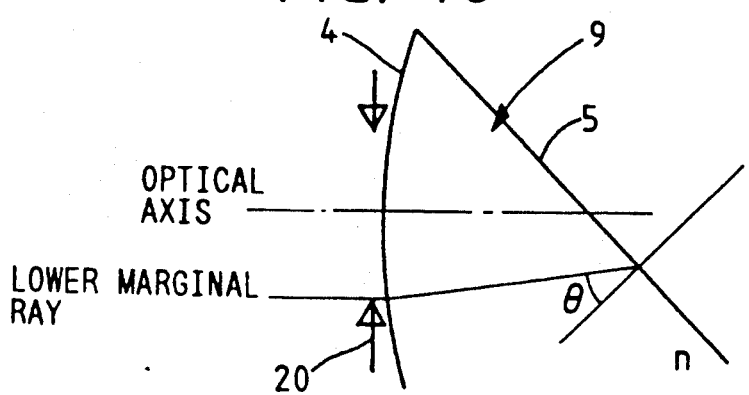
FIG. 16 is a diagram illustrating how the lower marginal ray passing through an aperture stop is incident on the first reflecting surface.

FIG. 15 illustrates the Embodiment 4 of the present invention. In this embodiment, the aperture stop 20 is arranged before the positive lens component 4, and the totally reflecting surfaces 5 and 6 are set at an angle different from 45° relative to the optical axis of the rays incident on the positive lens component 4 so that rays of a larger amount can be utilized for focus detection. In this embodiment, the aperture stop 20 has an aperture diameter of 3 mm and arranged eccentrically 0.75 mm upward from the optical axis of the positive lens component 4, and the totally reflecting surfaces 5 and 6 are set at 47° relative to the optical axis of the rays incident on the positive lens component. When the angle of incidence, on the first reflecting surface 5, of the lower marginal ray passing through the aperture stop 20 is represented by $\theta$ and the refractive index of the prism 9 is designated by n as shown in FIG. 16, the inclination angle of the first reflecting surface 5 is generally set so as to satisfy $\sin^{-1}(1/n) > 1$. Further, the inclination angle of the second reflecting surface 6 is set at the same value as that of the first reflecting surface 5.

The positive lens component 4 used in the Embodiments 2 through 4 described above has the numerical data listed below:

| Radius of curvature on the surface of incidence | $R = 3.87576$ |
|---|---|
| Aspherical surface coefficients | $P = 0.378637$ |
| | $E = -0.106781 \times 10^{-2}$ |
| | $F = 0.901748 \times 10^{-3}$ |
| | $G = -0.243196 \times 10^{-3}$ |
| | $H = 0.235946 \times 10^{-4}$ |
| Refractive indices of prism member | $n_d = 1.49216$ |
| | $n_c = 1.48957$ |
| | $n_e = 1.4942$ |
| | $n_F = 1.49813$ |

Formula of aspherical surface wherein the optical axis is taken as the Z axis. f=7.9, Offaxial image height=0.3.

Though not illustrated in the drawings, it is possible to increase amount of rays which are utilizable for focus detection by the methods described below. That is to say, the positive lens component is designed so as to have refractive powers different from location on the surface of incidence thereof by adopting asymmetry into the refractive power of the surface of incidence, for example, by designing the surface of incidence of the positive lens component 4 as an aspherical surface or imparting a refractive index distribution in the vicinity of said surface of the prism member. In this case, shape of the aspherical surface or the refractive power distribution of the positive lens component 4 is to be determined so that the rays which would otherwise pass through the first reflecting surface 5, out of the rays entering the prism through the surface of incidence, are incident on the first reflecting surface 5 at such angles as to allow total reflection of the rays on the first reflecting surface 5. Further, said surface of incidence may be arranged eccentrically so as to change the angle of incidence of the imaging light bundle as a whole on the first reflecting surface 5 and reduce amount of rays passing through the first reflecting surface 5. Furthermore, a birefringent member such as a liquid crystal may be arranged on the surface of incidence of the positive lens component 4 so as to reduce amount of rays passing through the first reflecting surface 5. Speaking concretely, the birefringent member which has different refractive indices for the ordinary ray and the extraordinary ray can lead all imaging rays so as to be totally reflected on the first reflecting surface 5 when molecular orientation of the liquid crystal is determined so that the rays which would otherwise pass through the first reflecting surface 5 are the extraordinary ray on the surface of incidence of the positive lens component 4 and the rays which would otherwise be totally reflected by the first reflecting surface 5 are the ordinary rays in the surface of incidence of the positive lens component 4.

In addition, it is possible by adjusting the inclinations of the totally reflecting surfaces, to reduce the degree of the eccentricity of the aperture stop or degree of asymmetry of the refractive powers of the surfaces of incidence of the imaging optical systems.

Figure 17:
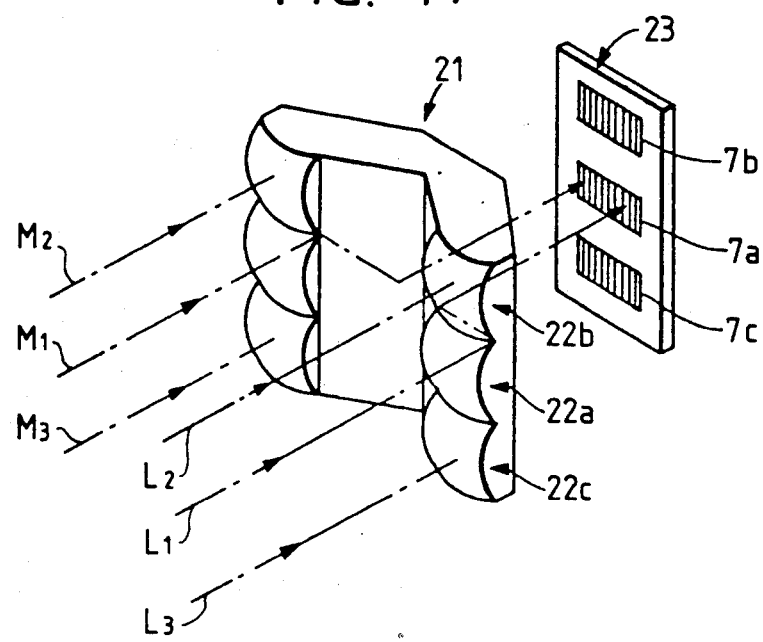
FIG. 17 is a perspective view illustrating an Embodiment 5 of the present invention.
Figure 18:
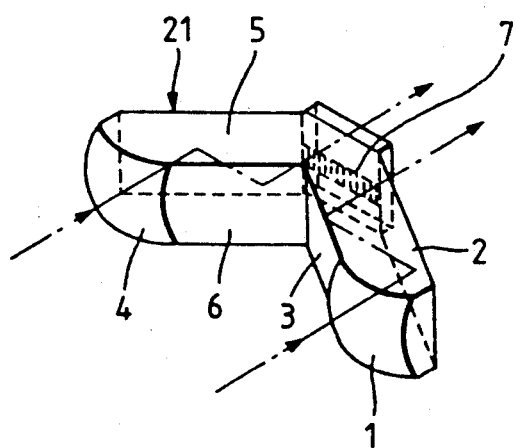
FIG. 18 is a perspective view illustrating a unit block used in the Embodiment 5 of the present invention.

FIG. 17 illustrates a perspective view illustrating the Embodiment 5 of the present invention wherein the first imaging optical system and the second imaging optical system are composed as a single block as shown in FIG. 18, and three vertically mounted blocks are formed as a single prism member 21 which is molded by using a material such as plastic and a single mold. In the vicinity of the light exit surface of the prism member 21, photoelectric converter elements 7a, 7b and 7c are arranged at the positions corresponding to the first through third blocks respectively. Speaking more concretely, the optical axis $L_1$ of the first imaging optical system and the optical axis $M_1$ of the second imaging optical system of the first block 22a, the optical axis $L_2$ of the first imaging optical system and the optical axis $M_2$ of the second imaging optical system of the second block 22b, and the optical axis $L_3$ of the first imaging optical system and the optical axis $M_3$ of the second imaging optical system of the third block 22c are located on three planes which are parallel with one another, whereas the optical axes $L_1$, $L_2$ and $L_3$ of the first imaging optical systems, and the optical axes $M_1$, $M_2$ and $M_3$ of the second imaging optical systems are located on two planes respectively which are perpendicular to said three planes. Further, the photoelectric converter elements 7a, 7b and 7c are composed of PSD or CCD arrays having position detecting functions in the directions of the base lines (a straight line which is perpendicular to the plane including both the optical axis $L_1$ of the first imaging optical system and the optical axis $M_1$ of the second imaging optical system, a straight line which is perpendicular to the plane including both the optical axis $L_2$ of the first imaging optical system and the optical axis $M_2$ of the second imaging optical system, and a straight line which is perpendicular to the plane including both the optical axis $L_3$ of the first imaging optical system and the optical axis $M_3$ of the second imaging optical system), and located in the vicinity of images formed with the paraxial rays by the blocks 22a, 22b and 22c respectively, desirably on a package 23. The prism member 21 may be cemented to the photoelectric converter element or fixed by an adequate means so as to be usable as a member 23 for supporting the photoelectric converter elements. Further, the Embodiment 5 can be used as the active type focus detecting optical system when a light emitting element is used in place of the photoelectic converter element corresponding to either of the first imaging optical system and the second imaging optical system of each of the first through third blocks 22a, 22b and 22c.

Figure 19:
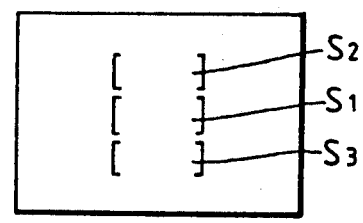
FIG. 19 is a diagram illustrating a range of distance measurement on a photographing image surface on the Embodiment 5 of the present invention.

FIG. 19 shows a diagram illustrating regions within a visual field to be photographed which are to be covered by the photoelectric converter elements 7a, 7b, and 7c respectively. The region $S_1$ is to be covered by the photoelectric converter element 7a, the region $S_2$ is to be covered by the photoelectric element 7b, and the region $S_3$ is to be covered by the photoelectric element 7c.

In the Embodiment 5 which has the configuration described above, the first through third blocks 22a, 22b and 22c have distance measurement ranges $S_1$, $S_2$ and $S_3$ respectively on a photographing image surface shown in FIG. 19. That is to say, the Embodiment 5 has a total range of distance measurement three times as wides as the conventional focus detecting optical system since the Embodiment 5 comprises three blocks each of which has the same distance measurement range as that of the conventional focus detecting optical system. Accordingly, the Embodiment 5 permits measuring distance within a board range on the photographing image surface. Further, the Embodiment 5 makes it possible to focus a photographic lens system on an object to be photographed without locking the focusing system even when a main image of the object to be photographed is not located at the center of the image surface since it permits detecting a focused condition by selectively utilizing distance measurement data obtained with the marginal blocks, i.e., the second block 22b and the third block 22c. Furthermore, the Embodiment 5 remarkably reduces the number of parts and manufacturing cost of the focus detecting optical system owing to the integrally molded prism member 21 which substitutes for a total of 21 parts required for composing the three blocks by the prior art, i.e., six positive lens components, twelve reflecting mirrors and three photoelectric converter elements. Moreover, the integrally molded prism member 21 serves for reducing errors in dimensions and inclination of the parts composing the three blocks of optical systems, and the totally reflecting surfaces which are molded with the same planer surface of a mold are highly effective for reducing errors in inclination angles of the reflecting surfaces. In addition, the Embodiment 5 requires nearly no mutual matching among the optical elements thereof.

Figure 20:
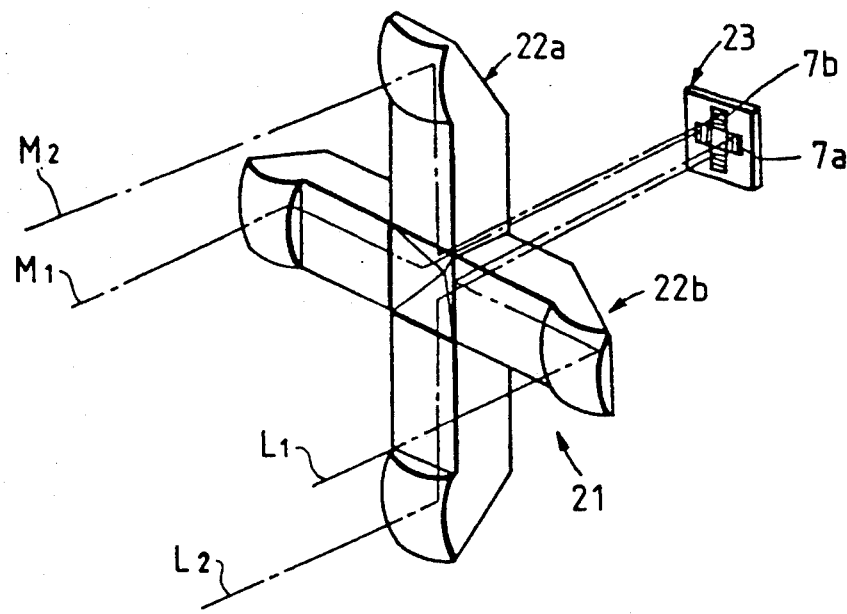
FIG. 20 is a perspective view illustrating an Embodiment 6 of the present invention.

FIG. 20 illustrates a perspective view the Embodiment 6 of the present invention wherein the first block 22a and the second the Embodiment 5 comprises three blocks each of which has the same distance measurement range as that of the conventional focus detecting optical system. Accordingly, the Embodiment 5 permits measuring distance within a board range on the photographing image surface. Further, the Embodiment 5 makes it possible to focus a photographic lens system on an object to be photographed without locking the focusing system even when a main image of the object to be photographed is not located at the center of the image surface since it permits detecting a focused condition by selectively utilizing distance measurement data obtained with the marginal blocks, i.e., the second block 22b and the third block 22c. Furthermore, the Embodiment 5 remarkably reduces the number of parts and manufacturing cost of the focus detecting optical system owing to the integrally molded prism member 21 which substitutes for a total of 21 parts required for composing the three blocks by the prior art, i.e., six positive lens components, twelve reflecting mirrors and three photoelectric converter elements. Moreover, the integrally molded prism member 21 serves for reducing errors in dimensions and inclination of the parts composing the three blocks of optical systems, and the totally reflecting surfaces which are molded with the same planer surface of a mold are highly effective for reducing errors in inclination angles of the reflecting surfaces. In addition, the Embodiment 5 requires nearly no mutual matching among the optical elements thereof.

Figure 21:
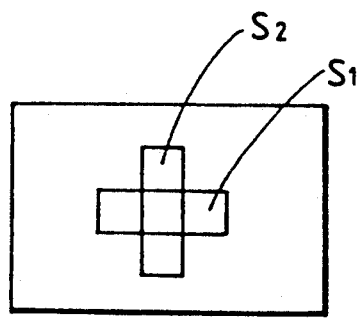
FIG. 21 is a diagram illustrating a range of distance measurement in the Embodiment 6 of the present invention.

FIG. 20 illustrates a perspective view the Embodiment 6 of the present invention wherein the first block 22a and the second block 22b are combined so as to intersect the directions of the base lines thereof with each other (for example, at an angle of 90°), and also the photoelectric converter elements 7a and 7b are intersecting with each other correspondingly. Accordingly, the distance measurement ranges on the photographing image surface is as shown in FIG. 21 in the Embodiment 6. Since the Embodiment 6 comprises the two blocks having the base lines in directions different from each other, it is capable of detecting a focused condition, even when a distance between two images of a linear object extending in the direction parallel with the base line of one of the blocks cannot be determined with this block and the photographic lens system cannot be focused on the object, by using the other block which has the base line intersecting with the longitudinal direction of said linear object.

Figure 22:
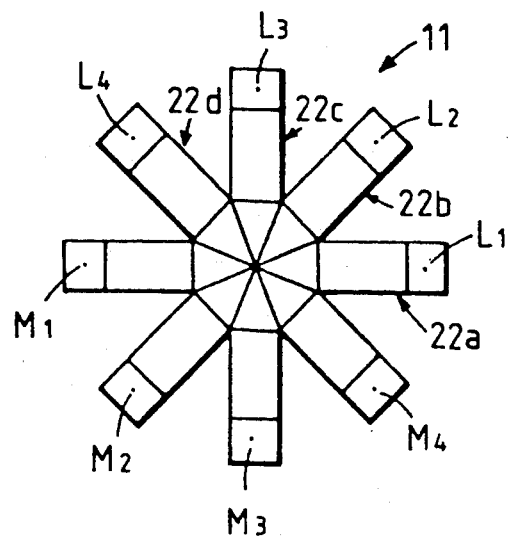
FIG. 22 is a front view illustrating a modification of the Embodiment 6 of the present invention.
Figure 23:
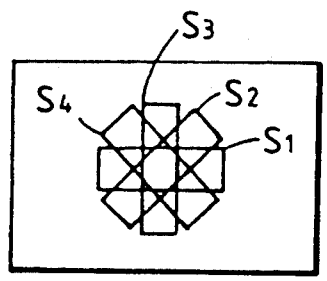
FIG. 23 is a diagram illustrating a range of distance measurement in the modification shown in FIG. 22.

FIG. 22 is a front view illustrating a modification of the Embodiment 6, wherein the first through fourth blocks 22a, 22b, 22c and 22d are combined so as to intersect the base lines thereof with one another. In this case, the distance measurement range is as illustrated in FIG. 23.

Figure 24:
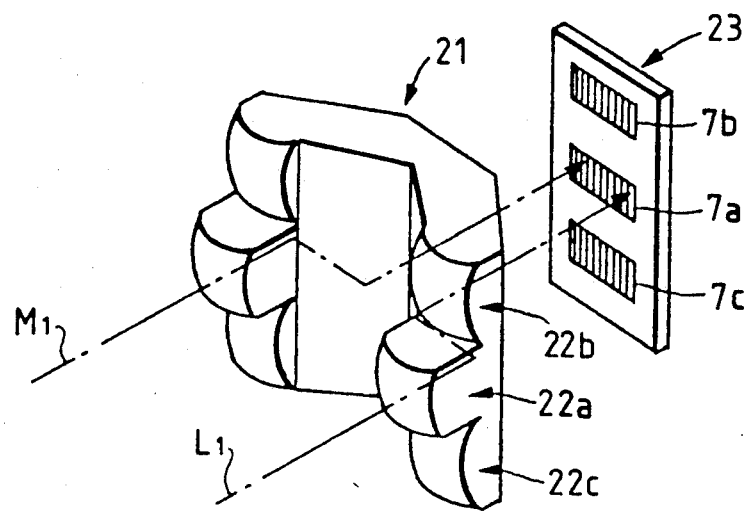
FIG. 24 is a perspective view illustrating an Embodiment 7 of the present invention.

FIG. 24 is a perspective view illustrating the Embodiment 7 of the present invention, wherein the optical system of one of the three blocks 22a, 22b and 22c used in the Embodiment 5, for example, the first block 22a, is designed so as to have a focal length which is longer than the focal length of the second and third blocks 22b and 22c for enhancing focus detecting accuracy or vary focusing accuracy dependently on locations of focus detection on the the photoelectric converter element 7 of the second imaging optical system when an object to be photographed is located at infinite distance, i.e., when the distance $x_1$ as measured from the first imaging optical system to the object is infinite ($x_1 = \infty$). Let us further assume that an image is formed at a location $P_2$ on the light receiving surface of the photoelectric converter element 7 when the object is brought to a nearer point a, i.e., when the distance as measured from the first imaging optical system to the point a is $x_2$. In this case, the following relationship establishes:

$$x_2 = \frac{\delta \times f}{P_2 - P_1} \qquad (1)$$

wherein the reference symbol f represents the focal length of the optical system and the reference symbol $\delta$ designates the length of the base line of the block.

Hence, $x_2$ is prolonged by shortening $P_1 - P_2$ or prolonging f or $\delta$. Since $\Delta x$ is given by the following formula:

$$\Delta x = x_1 - x_2 = \infty - x_2 \qquad (2)$$

Figure 25:
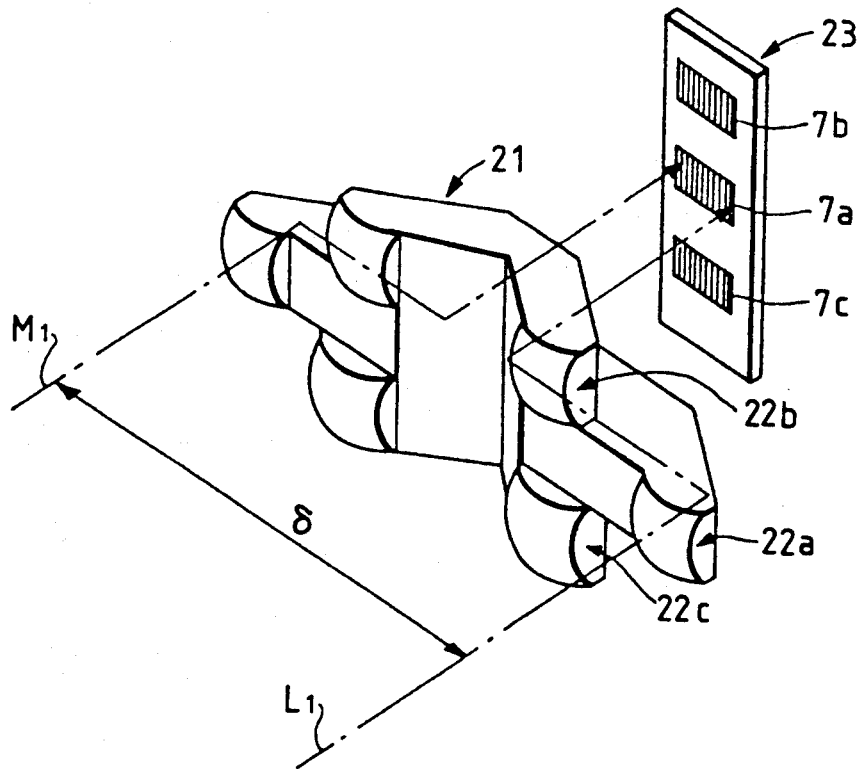
FIG. 25 is a perspective view illustrating a modification of the Embodiment 7 of the present invention.
Figure 26:
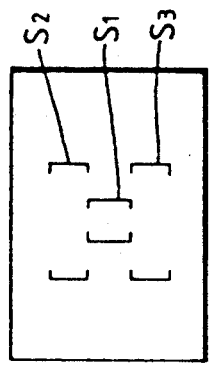
FIG. 26 is a diagram illustrating ranges of distance measurement in the Embodiment 7 and the modification thereof.
Figure 27:
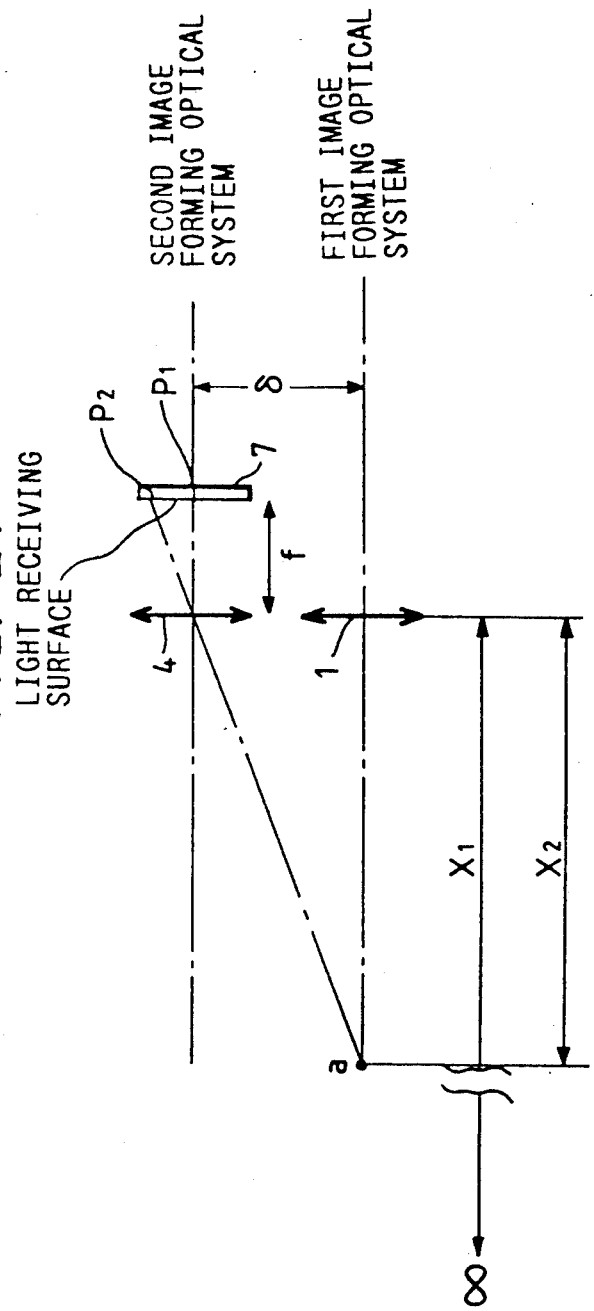
FIG. 27 is a diagram illustrating relationship of variation of object point versus focal length and length of base line in the focus detecting optical system according to the present invention.

$\Delta x$ is shortened by prolonging $x_2$. Hence, positional deviation is enlarged on the photoelectric converter element 7 and focus detecting accuracy can be enhanced by shortening $P_1 - P_2$ or prolonging f or $\delta$. Inversely, focus detecting accuracy is lowered by shortening f or $\delta$. Accordingly, the focus detecting optical system illustrated in FIG. 24 or FIG. 25 permits performing rough focus detection at the marginal portions of the visual field and strict focus detection at the central portion of thereof. In this case, the distance measurement range is as illustrated in FIG. 26. FIG. 27 illustrates the relationship between variation of the object point versus focal length and length of the base line in the focus detecting optical system.

Figure 28:
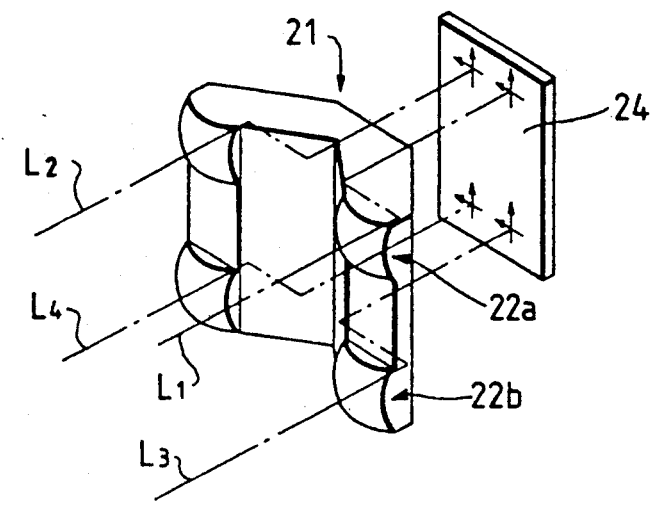
FIG. 28 is a perspective view illustrating an Embodiment 8 of the present invention.

FIG. 28 is a perspective view illustrating the Embodiment 8 of the present invention which is adapted to permit focus detection not only by detecting the spacing between two images formed with the two imaging optical systems comprised in each block as in the Embodiments 5 through 7 but also by detecting the spacing between two images formed with the pairs of the optical systems comprised in the different blocks. That is to say, the Embodiment 8 is adapted to permit focus detection not only by detecting the spacing between images formed by the imaging optical systems having the optical axes $L_1$ and $L_2$ or two optical systems having the optical axes $L_3$ and $L_4$, but also by detecting the spacing between two images formed with the two imaging optical systems having the optical axes $L_1$ and $L_3$ or the two imaging optical systems having the optical axes $L_2$ and $L_4$. In addition, the reference numeral 24 represents an area sensor in FIG. 28. The Embodiment 8 uses each of the imaging optical systems for detecting spacing between two images in both the horizontal and vertical directions, thereby making it possible to carry out focus detection in a broad range and with no directivity by using a smaller number of parts.

Figure 29:
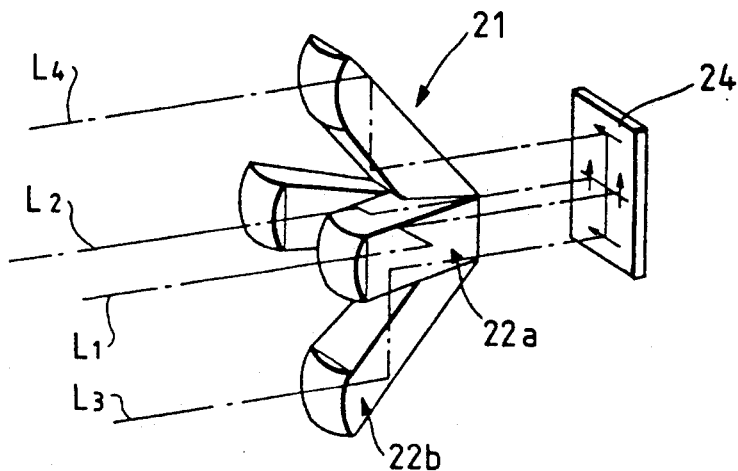
FIG. 29 is a perspective view illustrating a modification of the Embodiment 8 of the present invention.

FIG. 29 shows a modification of the Embodiments 8 wherein different blocks are combined so as to perpendicularly intersect the base lines thereof, whereby the focus detecting optical system is adapted to be capable of detecting not only the spacing between two images formed with the two imaging optical systems comprised in the same block but also the spacing between two images comprised in different blocks, like the focus detecting system described above as the Embodiment 8.

Figure 30:
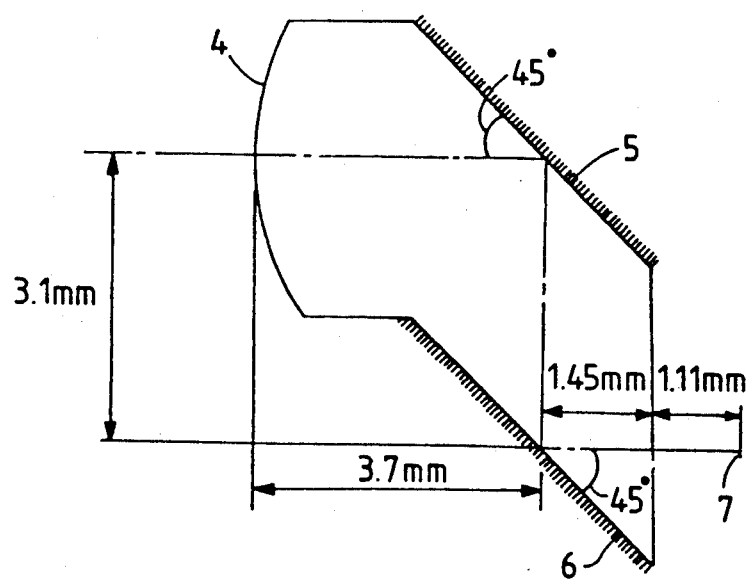
FIG. 30 is a diagram illustrating examples of concrete sizes of the unit optical system used in the Embodiments 5 through 8 of the present invention.

FIG. 30 illustrates dimensions of a concrete example of the unit imaging optical system used in all the blocks used in the Embodiment 5, the second and third blocks used in the Embodiment 7 and the modification thereof, and all the blocks used in the Embodiment 8 and the modification thereof. The positive lens component 4 adopted for the imaging optical system has the following numerical data:

| | |
|---|---|
| Radius of curvature on the surface of incidence | R = 3.44512 |
| Aspherical surface coefficient | P = 0.367393 |
| | E = 0.809783 × $10^{-4}$ |
| | F = 0.347359 × $10^{-3}$ |
| | G = −0.110218 × $10^{-3}$ |
| | H = −0.130618 × $10^{-4}$ |
| Refractive indices of prism member | $n_d$ = 1.49216 |
| | $n_c$ = 1.48957 |
| | $n_e$ = 1.49420 |
| | $n_F$ = 1.49813 |

The formula expressing the aspherical surface is the same as that described with reference to FIG. 11. NA=0.24, f=7.9, Image height=0.2, and the wavelength of the d-line is used as standard.

The unit imaging optical system shown in FIG. 11 is used as a concrete example illustrating the dimensions of the unit imaging optical system to used in all the blocks of the Embodiment 6 and the first block of the modification of the Embodiment 7. The positive lens component 4 used in this imaging optical system has the numerical data which have been described with reference to FIG. 11.

The focus detecting optical system preferred as the Embodiments 5 through 8 can be used, needless to say, as the TTL type.

In addition, the Embodiment 5 can be of course modified into a focus detecting optical system allowing less measuring errors by adopting the light shielding means for eliminating the stray light, or adequately selecting positions of the aperture stops and/or angles of the totally reflecting surfaces as in the cases of the Embodiments 1 through 4.

What is claimed is:

1. A focus detecting optical system comprising:
 a first imaging optical system having a first aperture stop disposed on a first optical axis and a first totally reflecting surface disposed along said first optical axis so as to obliquely intersect therewith; and
 a second imaging optical system having a second aperture stop disposed on a second optical axis and a second totally reflecting surface disposed on said second optical axis so as to intersect obliquely therewith;
 wherein said focus detecting optical system performs focus detection on the basis of relative positional relationship between a first image of an object formed with said first imaging optical system and a second image of the object formed with said second imaging optical system;
 wherein said first and second imaging optical systems are composed of an integrally molded prism member, and said first and second aperture stops are disposed eccentrically with regard to said first and second optical axes respectively in directions separated from each other.

2. A focus detecting optical system according to claim 1 wherein each of said first and second imaging optical systems has a surface of light incidence designed as an aspherical surface.

3. A focus detecting optical system according to claim 1 wherein said prism member has a refractive index distribution at the locations of the surfaces of incidence of said first and second imaging optical systems.

4. A focus detecting optical system according to claim 1 wherein said first and second totally reflecting surfaces are inclined relative to the first and second optical axes respectively at an angle larger than 45°.

* * * * *